(12) United States Patent
Matsugaki et al.

(10) Patent No.: US 6,570,941 B1
(45) Date of Patent: May 27, 2003

(54) RECEIVER AND PHASE EXTRACTION CIRCUIT

(75) Inventors: Isao Matsugaki, Fukuoka (JP); Mutsuhiko Oishi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/477,837

(22) Filed: Jan. 5, 2000

(30) Foreign Application Priority Data

Jan. 5, 1999 (JP) .......................................... 11-000561

(51) Int. Cl.$^7$ .............................................. H04L 27/06
(52) U.S. Cl. ...................................... 375/342; 375/340
(58) Field of Search ................................ 375/147, 237, 375/238, 239, 256, 316, 322, 324, 326, 327, 340, 342, 355, 362, 375; 329/311, 312, 313

(56) References Cited

U.S. PATENT DOCUMENTS

| | | | | |
|---|---|---|---|---|
| 5,056,116 A | * | 10/1991 | Shimada et al. | 375/340 |
| 5,325,093 A | * | 6/1994 | Takamori | 341/155 |
| 5,594,763 A | * | 1/1997 | Nimishakavi | 375/376 |
| 5,745,530 A | * | 4/1998 | Baek et al. | 375/342 |
| 5,974,097 A | * | 10/1999 | Julyan et al. | 375/340 |
| 5,977,822 A | * | 11/1999 | Rybicki et al. | 329/313 |
| 6,081,561 A | * | 6/2000 | Julyan et al. | 375/340 |
| 6,091,789 A | * | 7/2000 | Weinholt | 375/371 |
| 6,236,696 B1 | * | 5/2001 | Aoki et al. | 375/376 |

FOREIGN PATENT DOCUMENTS

JP          06006397        1/1994

* cited by examiner

*Primary Examiner*—Chi Pham
*Assistant Examiner*—Khanh Cong Tran
(74) *Attorney, Agent, or Firm*—RatnerPrestia (57) ABSTRACT

A receiver and a phase extraction circuit are capable of demodulating at high resolution if the sampling frequency is close to the frequency of received signal. In the phase extraction circuit, the received signal modulated in phase is sampled when lowered to an intermediate frequency. When the sampling frequency at this time is selected around the intermediate frequency, a continuous data row appears in one position of the sampling data row. The position of the continuous portion is determined by the phase of the received signal, and therefore a one-to-one correspondence table of the continuous position and phase of received signal is prepared. By detecting the continuous position, the phase information can be obtained from the table. As a result, it is possible to demodulate directly at the intermediate frequency, and therefore the circuit scale is substantially simplified, the number of parts is curtailed, and the size is reduced.

11 Claims, 8 Drawing Sheets

RECEIVER AND PHASE EXTRACTION CIRCUIT

FIELD OF THE INVENTION

The present invention relates to a receiver for receiving a radio signal and a phase extraction circuit for extracting the phase of the received signal.

BACKGROUND OF THE INVENTION

Recently, in the field of mobile communication, radio communications are being digitized from the viewpoint of enhancement of secrecy and privacy, versatile services of data communications, and effective use of frequency resources. Phase modulation is widely used in digital mobile radio communication, for example, in Personal Handyphone System (PHS), π/4 shift Quatenary Phase Shift Keying (QPSK) is employed. To demodulate the phase modulated signal, the signal phase must be extracted.

Figure 8:
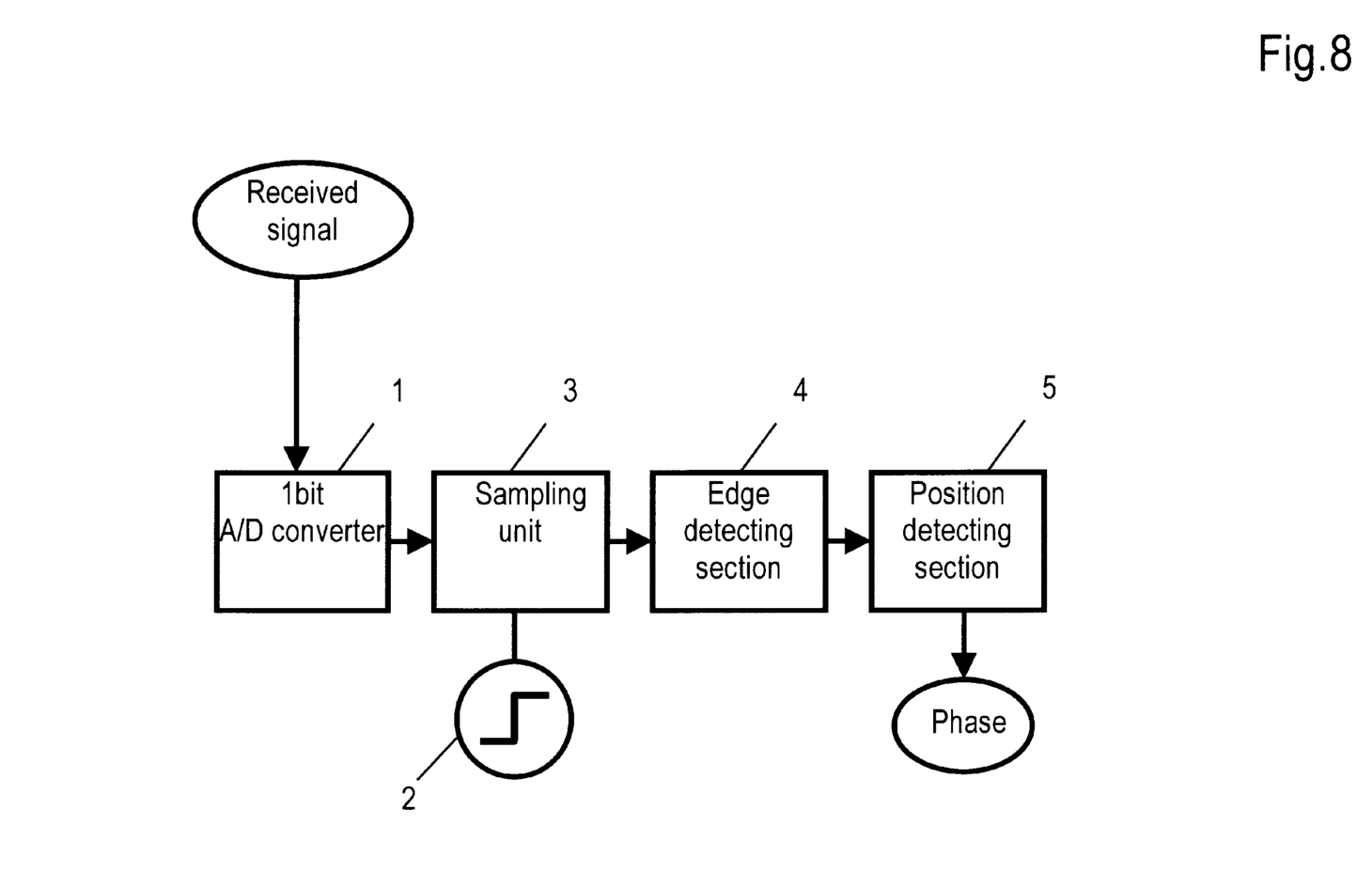
FIG. 8 is a block diagram showing a conventional phase extraction circuit.

FIG. 8 is a block diagram showing a conventional phase extraction circuit. In FIG. 8, the received signal is binarized in the amplitude by an A/D converter 1 of one bit, and becomes binarized data. In a sampling unit 3, the binarized data issued from the A/D converter 1 is sampled at a sufficiently high frequency oscillated at an oscillator 2. An edge detecting section 4 detects a rising edge (the portion changing from L level to H level) or a falling edge (the portion changing from H level to L level) from the sampling data issued from the sampling unit 3. A position detecting section 5 determines the phase from the difference between the position of the edge detected by the edge detecting section 4 and the reference position.

In the conventional phase extraction circuit, however, a high frequency must be oscillated as the sampling frequency. When the system timing frequency is high, the number of times of transition per unit time (the number of times of shifting to the transition zone causing power consumption) increases in the CMOS transistor for switching at this frequency. As a result, the power consumption of the receiver is increased. To save the power consumption, if the sampling frequency is lowered to be close to the frequency of the received signal, the phase resolution is not achieved.

Incidentally, in a constitution in which the phase of signal is extracted by lowering the received signal to a low frequency, very high frequency is not needed as the sampling frequency, but the filter and other parts corresponding to low frequency are large in size, and the device size cannot be reduced.

It is hence an object of the invention to present a phase extraction circuit capable of extracting phase at high resolution if the sampling frequency is close to the frequency of received signal.

SUMMARY OF THE INVENTION

To achieve the object, the receiver of the invention comprises:

(a). a frequency converter for lowering a received signal to an intermediate frequency, (b). a sampling unit for sampling the signal lowered to the intermediate frequency at a sampling frequency selected around the intermediate frequency, (c). a detecting section for detecting the position of a continuous portion of the same value occurring in a sampling data row obtained in the sampling unit, and (d). a phase information converter for converting the information of the continuous position in this sampling data row to phase information of the signal lowered to the intermediate frequency.

In this constitution, since the position of continuous portion is determined only by the phase of the input signal, by detecting the continuous position, the phase of the input signal can be easily obtained from the information of the continuous position. Moreover, without lowering to a low frequency, it is possible to demodulate at the intermediate frequency, so that the circuit can be substantially simplified.

A first constitution of the phase extraction circuit of the invention comprises:

(a). an A/D converter for binarizing the amplitude of an input signal, and issuing binarized data, (b). an oscillator for generating a timing signal for sampling, (c). a sampling unit for sampling the binarized data at a frequency of timing signal, and issuing sampling data, (d). a framing unit for assembling plural sampling data into one frame, (e). a continuous portion detecting section for detecting a portion of same value continuing at one side of the values of sampling data in one frame as a continuous portion, (f). a position detecting section for detecting the position of the continuous portion in one frame as a continuous portion position, (g). a phase correspondence table for preliminarily describing one-to-one relation of the continuous portion position in one frame and the phase of input signal, and (h). a phase allocation unit for determining the phase of input signal from the continuous portion position by using the phase correspondence table.

In the first constitution of the phase extraction circuit, since the position of continuous portion of same value is determined only by the phase of the input signal, by using the phase correspondence table preliminarily describing the one-to-one relation of continuous position and phase of input signal, the phase of the received signal can be easily obtained from the continuous portion position.

A second constitution of the phase extraction circuit of the invention is similar to the phase extraction circuit of the first constitution, and further comprises a position selector for selecting one continuous portion position if plural continuous portion positions of same value are present in one frame. In the second constitution of the phase extraction circuit, if plural continuous portion positions are present, the optimum continues portion position is selected, and the phase of the received signal may be obtained more easily.

A third constitution of the phase extraction circuit of the invention is similar to the phase extraction circuit of the first constitution, and further comprises a position averaging unit for determining the average position from plural continuous portion positions if plural continuous portion positions of same value are present in one frame. In the third constitution of the phase extraction circuit, if plural continuous portion positions are present, the average position thereof is determined, and the phase of the received signal may be obtained further easily.

DETAILED DESCRIPTION OF THE PREFERRED EMBODIMENTS

Referring now to the drawings, preferred embodiments of the invention are described in detail below.

(Embodiment 1)

Figure 1:
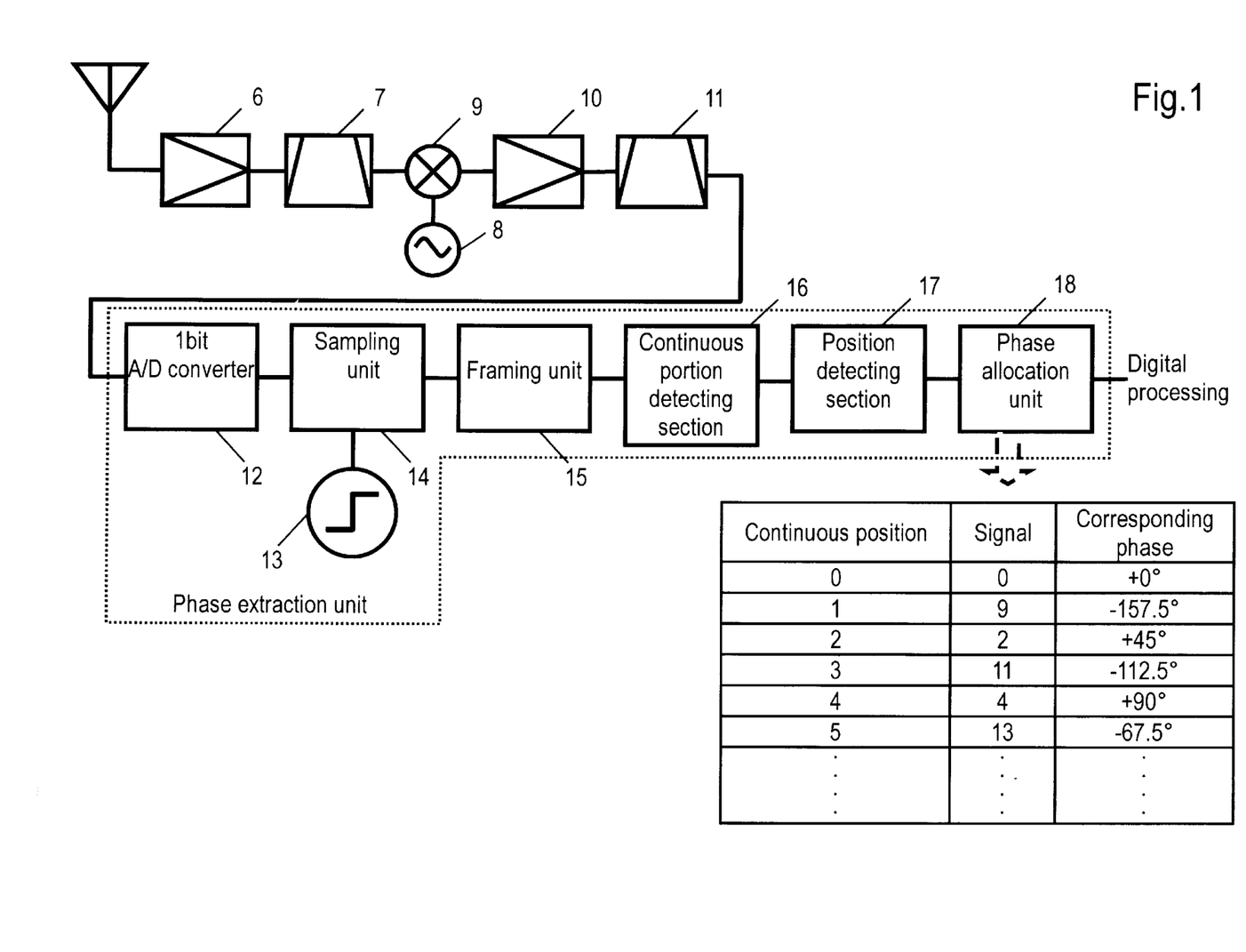
FIG. 1 is a block diagram showing a receiver in embodiment 1 of the invention.

FIG. 1 is a block diagram showing a receiver in embodiment 1 of the invention.

In FIG. 1, a radio (high) frequency amplifier 6 amplifies an incoming radio (high) frequency signal from an antenna. A first band pass filter 7 passes a signal of a desired band width from the received radio (high) frequency signal. A local oscillator 8 issues a local oscillation signal for converting the received signal into a signal of an intermediate frequency band. A mixer 9 mixes the signal passing through the first band pass filter 7 and the oscillation signal from the local oscillator 8. An intermediate frequency signal amplifier 10 amplifies the signal obtained by the mixer 9. A second band pass filter 11 limits the frequency band width of the intermediate frequency signal to a specified width.

A constitution of a phase extractor, which is a signal demodulator, is described below. An A/D converter 12 of one bit binarizes the amplitude of the received signal passing through the second band pass filter 11, and obtains binarized data. A timing oscillator 13 oscillates a timing signal for obtaining a sampling timing. The timing oscillator 13 issues, as the timing signal, a signal at a frequency deviated by a specified value from a double frequency of the fundamental frequency of the signal lowered to the intermediate frequency. Or, it is a feature of the timing oscillator 13 that applies, as the timing signal, a signal at a frequency deviated by a specified value from an integer multiple frequency of the fundamental frequency of the signal lowered to the intermediate frequency, to the sampling unit.

A sampling unit 14 samples the binarized data issued from the A/D converter 12 at the frequency oscillated by the oscillator 13, and obtains sampling data.

A framing unit 15 assembles plural sampling data obtained by sampling the binarized data in the sampling unit 14 into one frame.

A continuous portion detecting section 16 detects a portion continuing in either one of data values ("1" or "0") in the sampling data row assembled into one frame by the framing unit 15 as a continuous portion. For example, the continuous portion detecting section 16 detects continuing points of "0" in the sampling data row as continuous portion. A position detecting section 17 detects the edge position from the position of the continuous portion detected by the continuous portion detecting section 16.

A phase allocation unit 18 determines the phase of the received signal from the position of the continuous portion detected by the position detecting section 17 by using a phase calculation formula or phase correspondence table.

In thus constituted phase extraction circuit, the operation is described below. First, the radio (high) frequency signal received by the antenna is amplified by the radio (high) frequency amplifier 6, and passes through the first band pass filter 7. The signal passing through the first band pass filter 7 is mixed with the oscillation signal from the local oscillator 8 in the mixer 9, and is converted into the frequency of the difference. The signal converted in frequency by the mixer 9 is amplified in the intermediate frequency signal amplifier 10, and is limited in the band width in the second band pass filter 11, and is sent into the phase extractor (signal demodulator).

In the phase extractor, the amplitude of the received signal is binarized by the A/D converter 12 of one bit, and is issued from the A/D converter 12 as binarized data. The binarized data issued from the A/D converter 12 is sampled at the frequency oscillated by the oscillator 13 in the sampling unit 14, and sampling data is obtained.

Herein, suppose the oscillation frequency of the oscillator 13 is close to the frequency of the received signal binarized in the amplitude. The framing unit 15 divides the sampling data issued from the sampling unit 14, and issues a data row composed of plural sampling data as one frame. The continuous portion detecting section 16 detects the portion of continuing data "0" in the frame of the sampling data as continuous portion.

Figure 2:
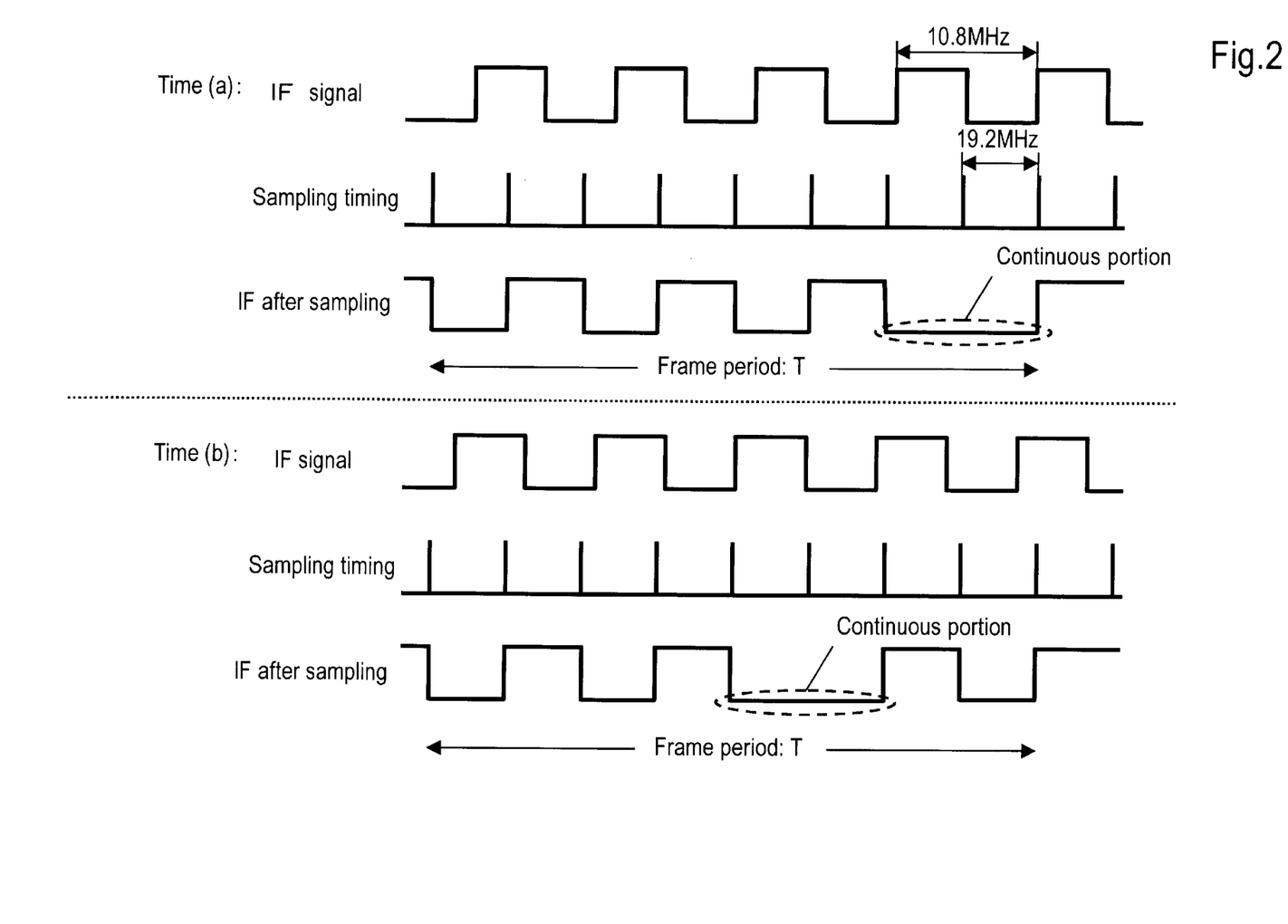
FIG. 2 is a timing chart explaining detection of continuous portion in a phase extraction circuit in the receiver of embodiment 1.

FIG. 2 explains detection of continuous portion. In FIG. 2, it shows an example of sampling at a frequency of about two times. The fundamental frequency of the intermediate frequency signal is 10.8 MHz, and the frequency (19.2 MHz) lower by 2.4 MHz from its two times (21.6 MHz) is the timing signal for sampling. When the intermediate frequency signal (IF signal) is sampled by such timing signal, in the intermediate frequency signal after sampling (IF after sampling), data "0" continues always at a certain time position. As shown in FIG. 2, when the position of the continuous portion detected at time (a) is different from the position of the continuous portion detected later at time (b), it is known that the phase of the intermediate frequency signal is changed between time (a) and time (b). Incidentally, the period for dividing the data in the framing unit 15 (frame period T shown in FIG. 2) is determined by the greatest common measure of the fundamental frequency (10.8 MHz) of the intermediate frequency signal and the frequency (19.2 MHz) of the sampling timing signal.

The position detecting section 17 detects the position of the continuous portion detected by the continuous portion detecting section 16 in the frame. The phase allocation unit 18 determines the phase of the received signal by using the phase correspondence the continuous portion in the frame.

Supposing one frame is composed of 16 samples, examples of phase calculation formula and phase correspondence table are explained. Herein, when the continuous portion is detected at the beginning of the frame, the position of the continuous portion is supposed to be 0, and when detected at the end of the frame, it is 15. In advance, the corresponding relation of the continuous portion position in the frame and the phase of the received signal is determined. Table 1 is a phase correspondence table showing an example of the corresponding relation.

TABLE 1

| Position of continuous portion | Phase of signal |
| --- | --- |
| 0 | 0 |
| 1 | 9 |
| 2 | 2 |
| 3 | 11 |
| 4 | 4 |
| 5 | 13 |
| 6 | 6 |
| 7 | 15 |
| 8 | 8 |
| 9 | 1 |
| 10 | 10 |
| 11 | 3 |
| 12 | 12 |
| 13 | 5 |
| 14 | 14 |
| 15 | 7 |

The phase allocation unit 18 quotes the phase of the received signal corresponding to the detected continuous portion position from the phase correspondence table in Table 1, and obtains the phase of the received signal.

An example of phase calculation formula is given below. Suppose the continuous portion position to be p_suc, the phase of the received signal to be ph, and the number of samples in one frame to be samp. In the case p_suc is an even number, the phase calculation formula is $$ph = p\_suc \qquad (1)$$

and the continuous portion position corresponds to the phase of the received signal.

In the case p_suc is an odd number, $$ph = (p\_suc = (samp \div 2))\% \, samp \qquad (2)$$

and by adding ½ of the number of samples in one frame to the continuous portion position, and dividing by the number of samples in one frame, the remainder is the phase of the received signal. Herein, the symbol "%" indicates calculation of the remainder (modulo operation).

As described herein, the embodiment operates as follows.
1. The binarized data from the A/D converter 12 is sampled at the oscillation frequency of the oscillator 13 to obtain sampling data,
2. A plurality (16 herein) of sampling data are assembled in one frame,
3. A portion continuing in one of the values of the sampling data in this frame is detected as a continuous portion,
4. The position of this continuous portion in the frame is detected as continuous portion position, and
5. The phase of the received signal is determined from the continuous portion position by using the phase correspondence table preliminarily mapping between the continuous portion position in the frame and the phase of the received signal.

By this operation, the phase of the received signal can be determined easily from the continuous portion position according to the phase correspondence table. Therefore, if the sampling frequency is close to the frequency of the received signal, the phase can be extracted at high resolution in the constitution of the embodiment. Also in the constitution of the embodiment, since it is possible to demodulate directly at the intermediate frequency, the circuit can be substantially simplified, and the number of parts is curtailed and the size is reduced.

In this example, the timing oscillator 13 issues a signal at frequency (19.2 MHz) deviated by a specified value from the double frequency of the fundamental frequency (10.8 MHz) of the intermediate frequency signal as timing signal, but the timing signal may be also obtained by deviating a specified value from the frequency of three times or four times of the fundamental frequency.

(Embodiment 2)

Figure 3:
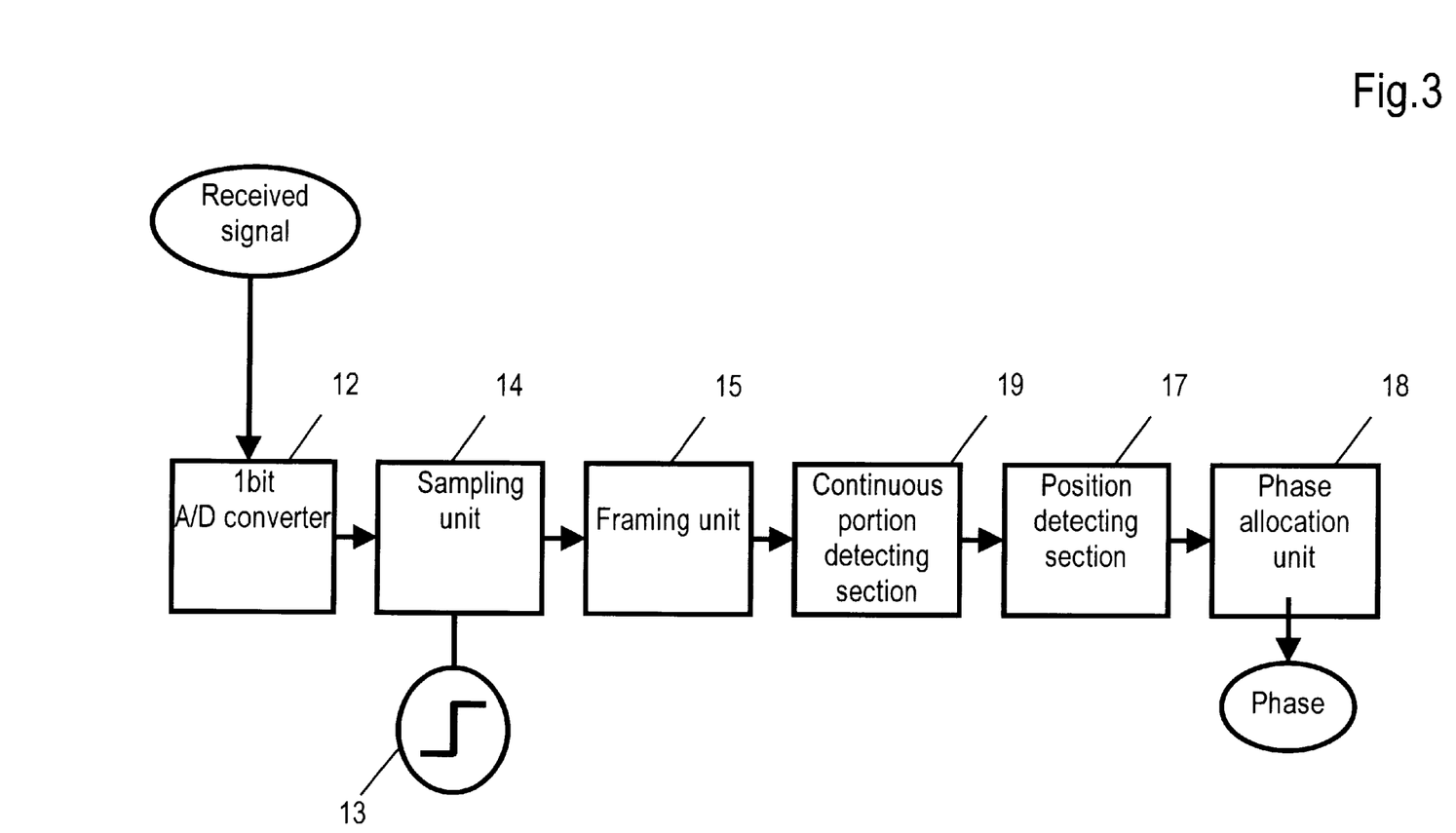
FIG. 3 is a block diagram showing a phase extraction circuit in embodiment 2 of the invention.

FIG. 3 is a block diagram showing a phase extraction circuit in embodiment 2 of the invention.

In FIG. 3, A/D converter 12, timing oscillator 13, sampling unit 14, position detecting section 17, framing unit 15, and phase allocation unit 18 are same as in FIG. 1, and are identified with same reference numerals and description is omitted.

The phase extraction circuit in embodiment 2 of the invention is composed of:

A/D converter 12, timing oscillator 13, sampling unit 14, position detecting section 17, framing unit 15, and phase allocation unit 18 shown in FIG. 1, and a continuous portion detecting section 19 for detecting continuing points of two values ("0" and "1") of the sampling data issued from the sampling unit 14 as a continuous portion.

That is, the continuous portion detecting section 19 detects the continuing "0" portion as a continuous portion, and also detects the continuing "1" portion as a continuous portion.

In thus constituted phase extraction circuit, the operation is described below.

The amplitude of the received signal is binarized by the A/D converter 12 of one bit, and binarized data is obtained. The binarized data is sampled at the frequency oscillated by the oscillator 13 in the sampling unit 14, and sampling data is obtained. The sampling timing is same as in embodiment 1, that is, the frequency (19.2 MHz) deviated by a specified value from the double frequency of the fundamental frequency (10.8 MHz) of the intermediate frequency signal. The sampling data obtained by sampling in the sampling unit 14 is divided into frames in the framing unit 15.

From the frame of sampling data row, the continuous portion detecting section 19 detects continuing portions of two values of the sampling data as continuous portions. The position detecting section 17 detects the positions of the continuous portions of two values in the frame. The phase allocation unit 18 determines the phase of the received signal by using the phase correspondence table in Table 1 from each continuous portion position.

As described herein, the embodiment operates as follows.
1. The binarized data from the A/D converter 12 is sampled at the oscillation frequency of the oscillator 13 to obtain sampling data,
2. A plurality of sampling data are assembled in one frame,
3. Continuing portions of two values of the sampling data in this frame are detected as continuous portions,
4. The positions of these continuous portions in the frame are detected as continuous portion positions, and
5. The phase of the received signal is determined from the continuous portion positions by using the phase correspondence table preliminarily mapping between the continuous portion positions in the frame and the phase of the received signal.

By this operation, in embodiment 2 of the invention, the phase of the received signal can be determined easily from the continuous portion positions according to the phase correspondence table 1. Therefore, the invention according to embodiment 2 can extract the phase at high resolution even if the sampling frequency is close to the frequency of the received signal.

(Embodiment 3)

Figure 4:
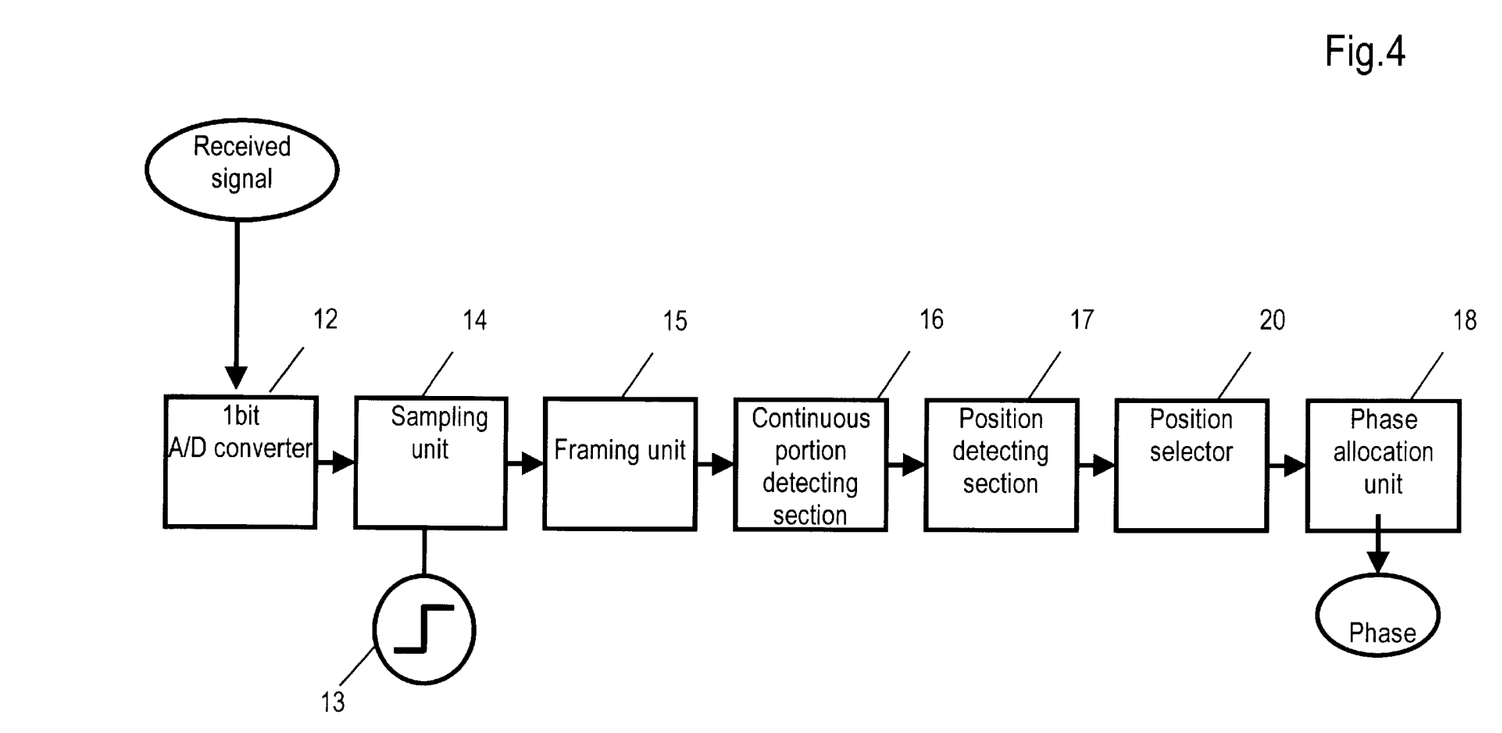
FIG. 4 is a block diagram showing a phase extraction circuit in embodiment 3 of the invention.

FIG. 4 is a block diagram showing a phase extraction circuit in embodiment 3 of the invention.

In FIG. 4, A/D converter 12, oscillator 13, sampling unit 14, position detecting section 17, framing unit 15, continuous portion detecting section 16, and phase allocation unit 18 are same as in FIG. 1, and are identified with same reference numerals and description is omitted.

The phase extraction circuit in embodiment 3 of the invention is composed of:

A/D converter 12, oscillator 13, sampling unit 14, position detecting section 17, framing unit 15, continuous portion detecting section 16, and phase allocation unit 18 shown in FIG. 4, and a position selector 20 for selecting one continuous portion position if a plurality of continuous portion positions detected by the position detecting section 17 are present in one frame.

In thus constituted phase extraction circuit, the operation is described below.

The amplitude of the received signal is binarized by the A/D converter 12 of one bit, and binarized data is obtained. The binarized data is sampled at the frequency oscillated by the oscillator 13 in the sampling unit 14, and sampling data is obtained. The sampling timing is same as in embodiment 1. The sampling data obtained by sampling in the sampling unit 14 is divided into frames in the framing unit 15.

From the frame of sampling data row, the continuous portion detecting section 16 detects a portion continuing in one of the values of the sampling data as a continuous portion. The position detecting section 17 detects the position of the continuous portion detected by the continuous portion detecting section 16 in the frame. The position selector 20 selects one continuous portion position if a plurality of continuous portion positions are present in one frame. From this one continuous portion position, the phase allocation unit 18 determines the phase of the received signal by using the phase correspondence table in Table 1.

As described herein, in this embodiment, if a plurality of continuous portion positions are present in one frame, since the position selector 20 for selecting one continuous portion position is provided, the optimum continuous portion position can be selected if there are plural continuous portion positions. Therefore, the phase of the received signal can be determined more easily, and if the sampling frequency is close to the frequency of the received signal, the invention according to embodiment 3 can extract the phase at high resolution.

(Embodiment 4)

Figure 5:
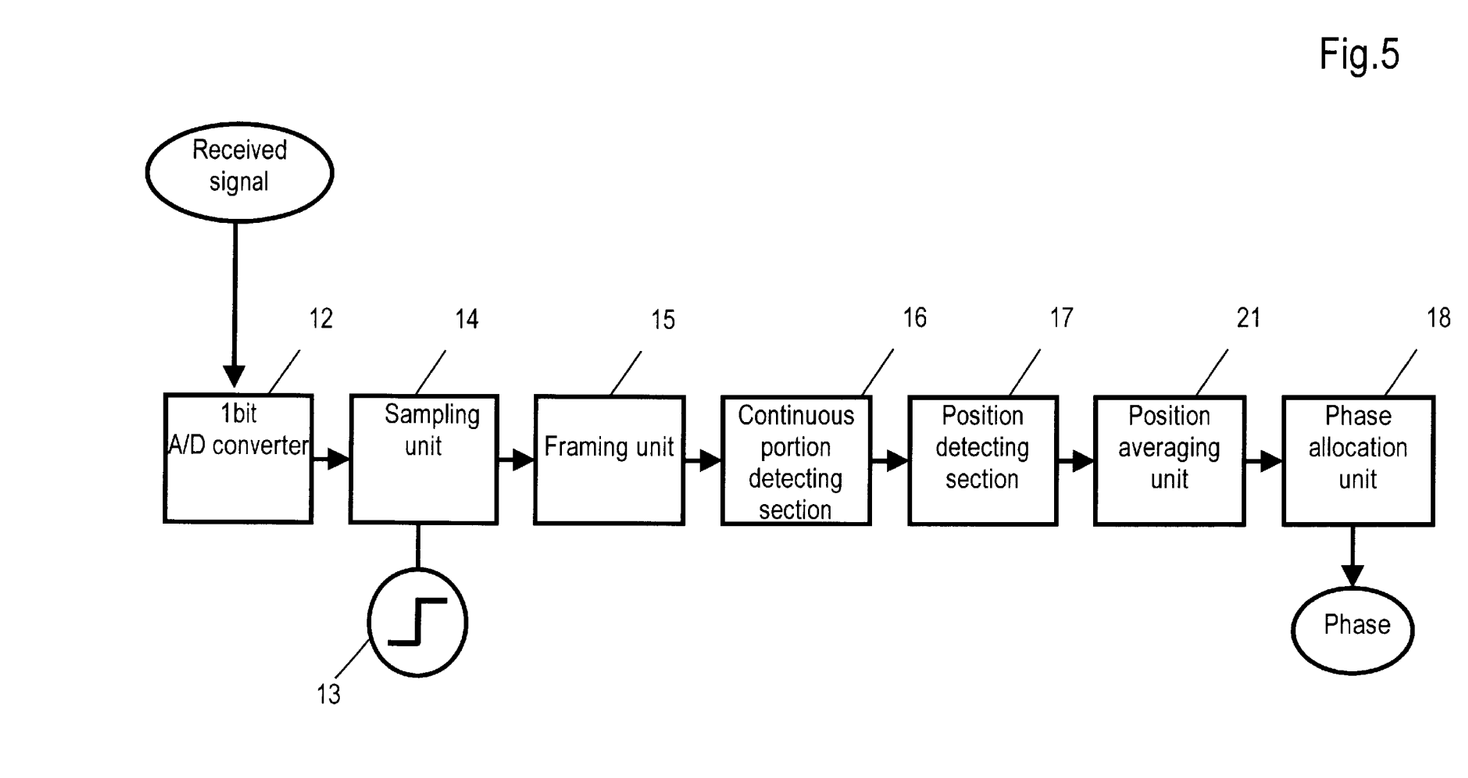
FIG. 5 is a block diagram showing a phase extraction circuit in embodiment 4 of the invention.

FIG. 5 is a block diagram showing a phase extraction circuit in embodiment 4 of the invention.

In FIG. 5, A/D converter 12, oscillator 13, sampling unit 14, position detecting section 17, framing unit 15, continuous portion detecting section 16, and phase allocation unit 18 are same as in FIG. 1, and are identified with same reference numerals and description is omitted.

The phase extraction circuit in embodiment 4 of the invention is composed of:

A/D converter 12, oscillator 13, sampling unit 14, position detecting section 17, framing unit 15, continuous portion detecting section 16, and phase allocation unit 18 shown in FIG. 1, and a position averaging unit 21 for determining the average position if a plurality of continuous portion positions detected by the position detecting section 17 are present in one frame.

In thus constituted phase extraction circuit, the operation is described below.

The amplitude of the received signal is binarized by the A/D converter 12 of one bit, and binarized data is obtained. The binarized data is sampled at the frequency oscillated by the oscillator 13 in the sampling unit 14, and sampling data is obtained. The sampling timing is same as in embodiment 1. The sampling data obtained by sampling in the sampling unit 14 is divided into frames in the framing unit 15.

From the frame of sampling data row, the continuous portion detecting section 19 detects continuing portions of two values of the sampling data as continuous portions. The position detecting section 17 detects the positions of the continuous portions of two values in the frame.

The position averaging unit 21 determines the average position if a plurality of continuous portion positions detected by the position detecting section 17 are present in one frame. The phase allocation unit 18 determines the phase of the received signal by using the phase correspondence table in Table 1 from the average position determined in the position averaging unit 21.

As described herein, in this embodiment, if a plurality of continuous portion positions are present in one frame, since the position averaging unit 21 for determining the average position from the plural continuous portion positions is provided, the average position is determined if there are plural continuous portion positions, and the phase of the received signal can be determined more easily. Therefore, if the sampling frequency is close to the frequency of the received signal, the invention according to embodiment 4 can extract the phase at high resolution.

(Embodiment 5)

Figure 6:
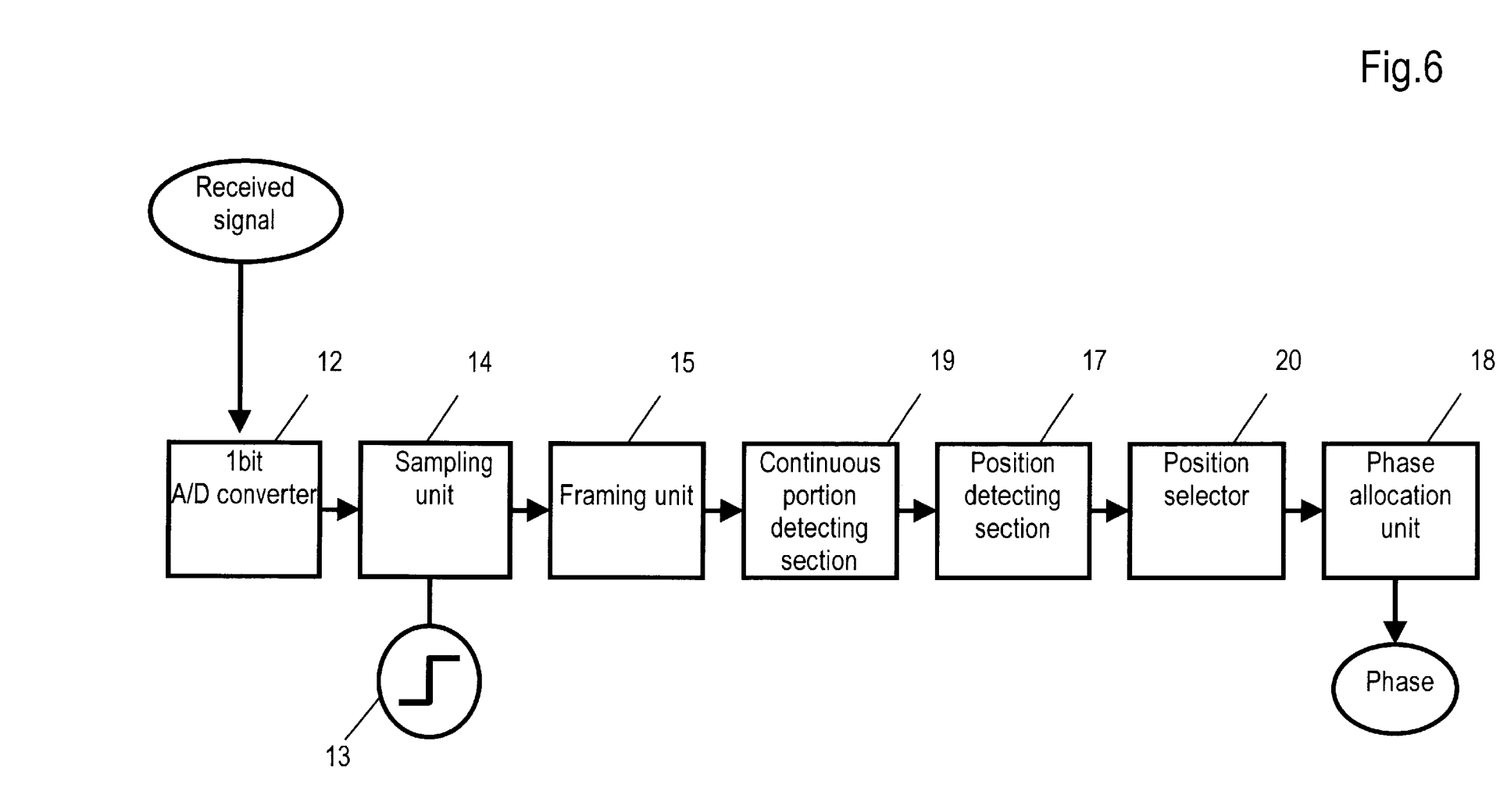
FIG. 6 is a block diagram showing a phase extraction circuit in embodiment 5 of the invention.

FIG. 6 is a block diagram showing a phase extraction circuit in embodiment 5 of the invention.

In FIG. 6, A/D converter 12, oscillator 13, sampling unit 14, position detecting section 17, framing unit 15, continuous portion detecting section 19, and phase allocation unit 18 are same as in FIG. 3, and further position selector 20 is same as in FIG. 4, and they are identified with same reference numerals and description is omitted.

In thus constituted phase extraction circuit, the operation is described below.

The amplitude of the received signal is binarized by the A/D converter 12 of one bit, and binarized data is obtained. The binarized data is sampled at the frequency oscillated by the oscillator 13 in the sampling unit 14, and sampling data is obtained. The sampling timing is same as in embodiment 1. The sampling data obtained by sampling in the sampling unit 14 is divided into frames in the framing unit 15.

From the frame of sampling data row, the continuous portion detecting section 19 detects continuing portions of two values of the sampling data as continuous portions. The position detecting section 17 detects the positions of the continuous portions of two values in the frame. The position selector 20 selects one continuous portion position if a plurality of continuous portion positions of two values of the sampling data are present in one frame. From each continuous portion position, the phase allocation unit 18 determines the phase of the received signal by using the phase correspondence table in Table 1.

As described herein, in this embodiment, if a plurality of continuous portion positions are present in one frame, since the position selector 20 for selecting one continuous portion position is provided, the optimum continuous portion position can be selected if there are plural continuous portion positions. Therefore, the phase of the received signal can be determined more easily, and if the sampling frequency is close to the frequency of the received signal, the invention according to embodiment 5 can extract the phase at high resolution.

(Embodiment 6)

Figure 7:
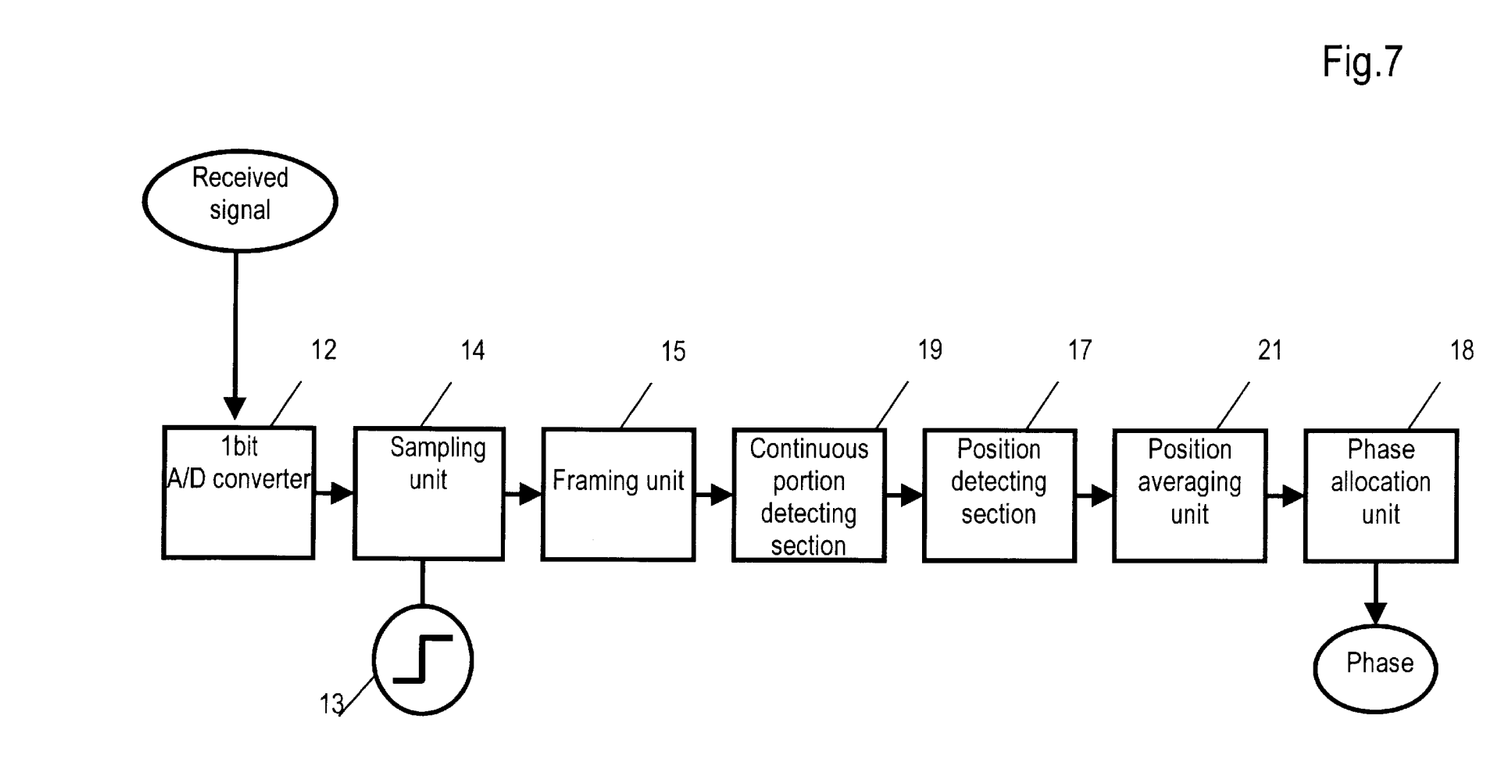
FIG. 7 is a block diagram showing a phase extraction circuit in embodiment 6 of the invention.

FIG. 7 is a block diagram showing a phase extraction circuit in embodiment 6 of the invention.

In FIG. 7, A/D converter 12, oscillator 13, sampling unit 14, position detecting section 17, framing unit 15, continuous portion detecting section 19, and phase allocation unit 18 are same as in FIG. 3, and further position averaging unit 21 is same as in FIG. 5, and they are identified with same reference numerals and description is omitted.

In thus constituted phase extraction circuit, the operation is described below.

The amplitude of the received signal is binarized by the A/D converter 12 of one bit, and binarized data is obtained. The binarized data is sampled at the frequency oscillated by the oscillator 13 in the sampling unit 14, and sampling data is obtained. The sampling timing is same as in embodiment 1. The sampling data obtained by sampling in the sampling unit 14 is divided into frames in the framing unit 15.

From the frame of sampling data row, the continuous portion detecting section 19 detects continuing portions of two values of the sampling data as continuous portions. The position detecting section 17 detects the positions of the continuous portions of two values in the frame. The position selector 20 selects one continuous portion position if a plurality of continuous portion positions of two values of the sampling data are present in one frame.

The position averaging unit 21 determines the average position of continuous portion positions of two values if a plurality of continuous portion positions of two values of the sampling data are present in one frame. The phase allocation unit 18 determines the phase of the received signal by using the phase correspondence table in Table 1 from the average position.

As described herein, in this embodiment, if a plurality of continuous portion positions are present in one frame, since the position averaging unit for determining the average position from the continuous portion positions is provided, the average position is determined if there are plural continuous portion positions. Therefore the phase of the received signal can be determined more easily, and if the sampling frequency is close to the frequency of the received signal, the invention according to embodiment 6 can extract the phase at high resolution.

What is claimed is:

1. A receiver comprising:
   a frequency converter for lowering a received signal to an intermediate frequency,
   a sampling unit for sampling the signal lowered to the intermediate frequency at a sampling frequency selected around the intermediate frequency,
   a position detecting section for detecting the position of a continuous portion of the same value occurring in a sampling data row obtained in said sampling unit, and
   a phase information converter for converting the information of the continuous position in said sampling data row to phase information of the signal lowered to said intermediate frequency.

2. The receiver of claim 1, wherein said sampling unit samples at a sampling frequency which is a frequency deviated by a specified value from an integer multiple frequency of the fundamental frequency of the signal lowered to the intermediate frequency.

3. A receiver comprising:
   a radio (high) frequency amplifier for amplifying the incoming radio (high) frequency signal from an antenna,
   a local oscillator for issuing a local oscillation signal for converting the received signal to a signal of an intermediate frequency band,
   a mixer for mixing the received signal and the oscillation signal from said local oscillator,
   an intermediate frequency signal amplifier for amplifying the signal obtained by said mixer,
   a band pass filter for limiting the frequency band width of intermediate frequency signal to a specified width,
   a sampling unit for sampling the signal lowered to the intermediate frequency at a sampling frequency selected around the intermediate frequency,
   a position detecting section for detecting the position of a continuous portion of the same value occurring in a sampling data row obtained in said sampling unit,
   a phase correspondence table preliminarily describing the one-to-one relation of the phase of signal lowered to said intermediate frequency and continuous position in said sampling data row, and
   a converter for converting the continuous position in said sampling data row into position information by said table.

4. A phase extraction circuit comprising:
   a sampling unit for sampling an input signal,
   a position detecting section for detecting the position of a continuous portion of the same value occurring in a sampling data row obtained in said sampling unit, and
   a phase information converter for converting the information of continuous position in said sampling data row into phase information of the signal lowered to said intermediate frequency.

5. A phase extraction circuit comprising:
   an A/D converter for binarizing the amplitude of an input signal, and issuing binarized data,
   an oscillator for generating a timing signal for sampling,
   a sampling unit for sampling said binarized data at a frequency of said timing signal, and issuing sampling data,
   a framing unit for assembling a plurality of said sampling data into one frame,
   a continuous portion detecting section for detecting a portion of same value continuing at one side of the values of said sampling data in one frame as a continuous portion,
   a position detecting section for detecting the position of said continuous portion in one frame as a continuous portion position,
   a phase correspondence table for preliminarily describing one-to-one relation of the continuous portion position in one frame and the phase of said input signal, and
   a phase allocation unit for determining the phase of said input signal from said continuous portion position by using said phase correspondence table.

6. The phase extraction circuit of claim 5, wherein said oscillator applies a signal at a frequency deviated by a specified value from an integer multiple frequency of the fundamental frequency of the signal lowered to the intermediate frequency as a timing signal to the sampling unit.

7. A phase extraction circuit comprising:
   an A/D converter for binarizing the amplitude of a received signal, and issuing binarized data,
   an oscillator for generating a timing signal for sampling,
   a sampling unit for sampling said binarized data at a frequency of said timing signal, and issuing sampling data, a framing unit for assembling a plurality of said sampling data into one frame, a continuous portion detecting section for detecting portions of same value continuing in two values of said sampling data in one frame as continuous portions, a position detecting section for detecting the positions of said continuous portions in one frame as continuous portion positions, and a phase allocation unit for determining the phase of said received signal from said continuous portion positions by using a phase correspondence table preliminarily mapping the continuous portion positions in one frame and phase of said received signal.

8. The phase extraction circuit of claim 5, further comprising a position selector for selecting one continuous portion position if plural continuous portion positions are present in one frame.

9. The phase extraction circuit of claim 5, further comprising a position averaging unit for determining the average position from the plural continuous portion positions if plural continuous portion positions are present in one frame.

10. The phase extraction circuit of claim 7, further comprising a position selector for selecting one continuous portion position each if plural continuous portion positions are present in one frame.

11. The phase extraction circuit of claim 7, further comprising a position averaging unit for determining the average position each from the continuous portion positions if plural continuous portion positions are present in one frame.

* * * * *